April 4, 1944.　　　T. A. WALDRON　　　2,346,058

CONSTANT-VELOCITY JOINT

Filed Sept. 9, 1942

INVENTOR
Thomas Alfred Waldron
BY Lawrence C. Witker
ATTORNEY

Patented Apr. 4, 1944

2,346,058

UNITED STATES PATENT OFFICE 2,346,058

CONSTANT-VELOCITY JOINT

Thomas Alfred Waldron, Birmingham, England, assignor to Spicer Manufacturing Corporation, Toledo, Ohio Application September 9, 1942, Serial No. 457,703
In Great Britain October 22, 1941

8 Claims. (Cl. 64—21)

This invention relates to a constant-velocity joint, for transmitting rotary motion, of the kind in which each shaft-end carries a pair of trunnion blocks the respective axes of which are at all times co-planar, each pair of blocks working between parallel faces of slots provided in an intermediate member. A well known joint of this kind is that known as the Tracta.

My main object is to provide improvements in this kind of joint and, in particular, to facilitate assembly of the parts, and also to ensure full contact of the trunnion blocks over a very wide angle.

In practice the jaws in which the pairs of blocks work are subjected to bending when the torque is applied, and a further and important object of the invention is to arrange for the load on the jaws to be taken in a satisfactory manner.

According to a more particular object of the invention, the intermediate member is enveloped in a steel sleeve which serves for the support of the jaws against bending.

According to a still further object of the invention, the intermediate member is of double-spherical form, and the trunnion blocks are located against axial movement in the slots therein, when towards the extremities of the jaws, by the enveloping sleeve. Axial location for the blocks, when well within the jaws, is preferably provided by pads held against the intermediate member by the enveloping sleeve.

In the accompanying sheet of drawings—

Figure 1:
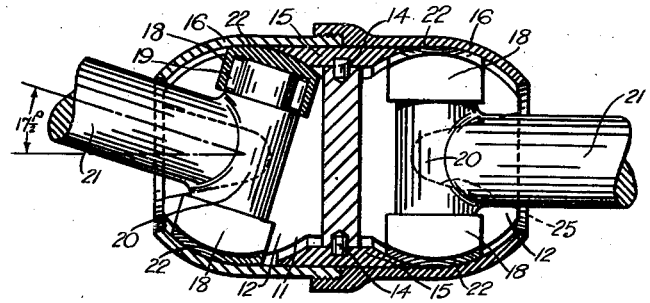
Figure 1 is a sectional elevation of a joint according to the invention, all but one of the trunnion blocks being shown in elevation.
Figure 2:
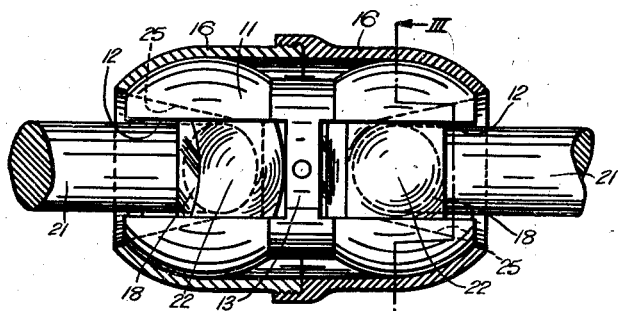
Figure 2 is a plan of the joint with the casing in section and the adjacent pad removed.
Figure 3:
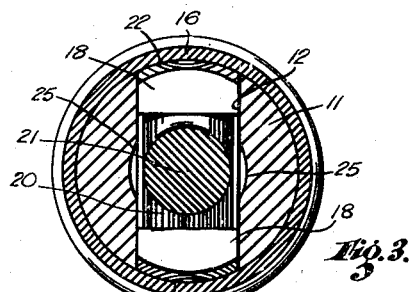
Figure 3 is a cross-section on the line III—III of Figure 2.
Figures 4, 5:
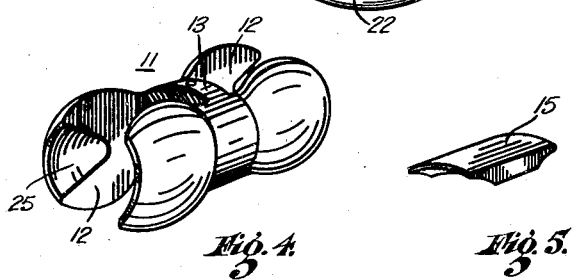
Figure 4 is a perspective view, to a smaller scale, of the intermediate member.
Figure 5 is a perspective view of one of the pads.

In the construction shown the intermediate member 11 is of short dumb-bell form, consisting of two spheres which may intersect one another when short length is required, and it is milled at opposite ends to provide the co-planar slots 12, 12 with parallel surfaces, or, of course, these slots could be broached. At the ends of the central partition 13 (between the two slots) are mounted, as by means of dowel pins 14 or the like, two pads 15 the internal surfaces of which contact the adjacent portions of the spheres, being wide enough to bridge the inner ends of the slots. The internal surfaces are arcuate about the centres of the spheres. The external surfaces are part-cylindrical, as shown. The parts are all held in position by means of coacting parts 16 of a sleeve having, for example, a screw-threaded engagement with one another, the remote ends of the sleeve being internally formed as part-spherical sockets to engage the adjacent surfaces of the spheres. The sleeve and intermediate member are, of course, of steel, but the pads 15 may be of lighter material.

The trunnion blocks 18 may be rectangular, barrel-shaped, or cylindrical. They are shown as rectangular thimble-like members carried, for example, through needle bearings 19, at the ends of transverse pins 20 which are in turn carried by the shaft-ends 21, the extremities 22 of the blocks being shaped to contact the appropriate arcuate surfaces on the pads and on the sleeve.

In this way the trunnion blocks 18 are maintained in position at the shaft-ends and the latter are located with respect to the slots 12 in the associated spheres. The bending to which the jaws are subjected by the torque is taken by the sleeve in tension. The trunnion blocks make substantially full contact with the parallel faces of the slots in all positions for ordinary angularity (i. e., each shaft being capable of moving through 35° with respect to the intermediate member), whereas in the extreme angular positions (for such 35° movement) the equivalent blocks in a Tracta joint make contact at one corner only, thus giving a very high pressure loading. In the present instance the left-hand shaft of Figure 1 is shown as making an angle of 17½° with the main axis of the sleeve, the shaft therefore being capable of moving through 35° with respect to the intermediate member, and if any greater angular movement were to occur one corner of the block would not be in driving contact. If still greater angular movement be required (with the present construction) it would be necessary to provide the slots 12 with greater lateral chamfers 25 at their sides to accommodate the shafts when angularly disposed to the maximum extent. In my estimation, with an overall angular movement of 50° for each shaft a greater contact area will be provided when in the extreme angular position than in the case of a Tracta joint of which each shaft has an overall angular movement of 35°.

By means of the invention a very compact constant-velocity joint can be built up to provide excellent bearing surfaces and, in consequence, to be of long life.

What I claim as my invention and desire to secure by Letters Patent of the United States is:

1. A constant-velocity joint between two shaft-ends, comprising a pair of trunnion blocks carried by each shaft-end, an intermediate member providing two pairs of jaws between which are co-planar slots having parallel faces, said pairs of trunnion blocks working in said slots, respectively, a steel sleeve enveloping said intermediate member and serving for the support of said jaws against bending when the joint is transmitting torque and pads interposed between said intermediate member and said sleeve for locating said trunnion blocks within said jaws.

2. A constant-velocity joint between two shaft-ends comprising a pair of trunnion blocks carried by each shaft-end, an intermediate member of double-spherical form having a pair of jaws at each end, said pairs of jaws providing co-planar slots with parallel faces, said pairs of trunnion blocks working in said slots, respectively, and a sleeve enveloping said intermediate member and serving for the axial location of said trunnion blocks when towards the extremities of said jaws.

3. A constant-velocity joint, according to claim 2, in combination with pads interposed between said intermediate member and sleeve and serving for the axial location of said trunnion blocks when well within said jaws.

4. A constant-velocity joint between two shaft-ends comprising a pair of trunnion blocks carried by each shaft-end, an intermediate member of double-spherical form having a pair of jaws at each end, said pairs of jaws providing co-planar slots with parallel faces, said pairs of trunnion blocks working in said slots, respectively, and a sleeve enveloping said intermediate member and serving for the axial location of said trunnion blocks when towards the extremities of said jaws, said sleeve being built up of two coacting parts having a screw-threaded engagement with one another.

5. In a constant-velocity joint between two shaft-ends, an intermediate member of double-spherical form having co-planar slots at each end, a pair of trunnions on each shaft end, each pair being received in one of said slots, and a sleeve enveloping said intermediate member, said sleeve comprising coacting parts which are secured to one another and have part-spherical sockets engaging the respective ends of said intermediate member for retaining said trunnions in said slots while permitting free angular movement of said shaft ends.

6. In a constant-velocity joint between two shaft-ends, an intermediate member of double-spherical form, and a sleeve enveloping said intermediate member, said sleeve comprising coacting parts which are secured to one another and have part-spherical sockets engaging the respective ends of said intermediate member, said intermediate member having a pair of jaws at each end, said pairs of jaws providing two coplanar slots with parallel faces.

7. In a constant-velocity joint between two shaft-ends, an intermediate member having part-spherical end portions united to one another, said end portions formed as jaws providing two coplanar slots with parallel faces, a sleeve enveloping said intermediate member, said sleeve being mainly cylindrical with part-spherical ends engaging said end portions, and pads fitting between said sleeve and the adjacent ends of said end portions, said pads disposed against the inner ends of said slots.

8. In a constant-velocity joint between two shaft-ends, an intermediate member having part-spherical end portions united to one another, said end portions formed as jaws providing two coplanar slots with parallel faces, a sleeve enveloping said intermediate member, said sleeve being mainly cylindrical with part-spherical ends engaging said end portions, and pads fitting between said sleeve and the adjacent ends of said end portions, said pads disposed against the inner ends of said slots, said intermediate member and sleeve being of steel and said pads of a lighter material.

THOMAS ALFRED WALDRON.